United States Patent [19]

Shen

[11] 4,362,861

[45] Dec. 7, 1982

[54] POLYESTERIMIDE

[75] Inventor: Dennis C. Shen, Clifton Park, N.Y.

[73] Assignee: Schenectady Chemicals, Inc., Schenectady, N.Y.

[21] Appl. No.: 311,386

[22] Filed: Oct. 14, 1981

Related U.S. Application Data

[63] Continuation-in-part of Ser. No. 220,160, Dec. 23, 1980, abandoned.

[51] Int. Cl.$^3$ .............................................. C08G 73/16
[52] U.S. Cl. ..................................... 528/289; 428/379; 428/383; 428/458; 428/473.5; 528/350
[58] Field of Search .................... 528/288, 289, 350; 428/379, 383, 458, 473.5

[56] References Cited

U.S. PATENT DOCUMENTS

| | | | |
|---|---|---|---|
| 3,312,573 | 4/1967 | Sheffer | 428/383 |
| 3,342,780 | 9/1967 | Meyer et al. | 528/279 |
| 3,426,098 | 2/1969 | Meyer et al. | 428/379 |
| 3,697,471 | 10/1972 | Schmidt et al. | 428/383 |
| 3,817,926 | 6/1974 | Pauze et al. | 528/73 |
| 3,833,546 | 9/1974 | Takekoshi et al. | 528/188 |
| 3,853,817 | 12/1974 | Weddleton | 528/289 |
| 3,922,252 | 11/1975 | Holub et al. | 525/424 |
| 3,944,706 | 3/1976 | Czajka | 428/383 |
| 3,959,233 | 5/1976 | Hanson et al. | 428/473.5 |
| 3,975,330 | 8/1976 | Suzuki et al. | 528/289 |
| 3,988,283 | 10/1976 | Shelby et al. | 528/188 |
| 4,012,555 | 3/1977 | Keske | 428/383 |
| 4,012,556 | 3/1977 | Keske | 428/383 |
| 4,018,736 | 4/1977 | Fabian et al. | 528/188 |
| 4,066,593 | 1/1978 | Cazjka et al. | 528/288 |
| 4,070,524 | 1/1978 | Keske | 428/383 |
| 4,075,179 | 2/1978 | Karkoski et al. | 528/289 |
| 4,081,427 | 3/1978 | Lange | 528/289 |
| 4,101,488 | 7/1978 | Ishizuka et al. | 528/289 |
| 4,105,639 | 8/1978 | Laganis et al. | 528/289 |
| 4,115,342 | 9/1978 | Shelby et al. | 528/289 |
| 4,116,941 | 9/1978 | Hanson | 528/289 |
| 4,117,032 | 9/1978 | Kwiecinski | 525/424 |
| 4,119,608 | 10/1978 | Keating | 528/188 |
| 4,127,553 | 11/1978 | Osada et al. | 528/188 |
| 4,145,334 | 3/1979 | Schmidt et al. | 528/189 |
| 4,208,464 | 6/1980 | Ishizuka et al. | 428/389 |

FOREIGN PATENT DOCUMENTS 45-18316  6/1970  Japan .................................. 528/289

Primary Examiner—Ronald W. Griffin
Attorney, Agent, or Firm—Cushman, Darby & Cushman

[57] ABSTRACT

A low molecular weight polyester-imide resin is prepared wherein there is employed as the dibasic acid either 100% of the diimide dicarboxylic prepared by reacting two moles of trimellitic anhydride with one mole of methylene dianiline (the diimide is abbreviated DID) or oxydianiline or the dibasic acid can also contain a small percent of another aromatic acid. The product is used to produce coated wires having outstanding heat shock. The product also is useful to provide a top coat to wire coated with a polyester or with another polyester-imide.

77 Claims, No Drawings

POLYESTERIMIDE

REFERENCE TO THE RELATED APPLICATION

This application is a continuation-in-part of application Ser. No. 220,160, filed Dec. 23, 1980 and now abandoned.

BACKGROUND OF THE INVENTION

The present invention relates to the preparation of novel polyester-imides and their use in coating wires with outstanding physical properties.

In Schmidt U.S. Pat. No. 3,697,471, there is disclosed in Example 9 a polyester-imide prepared from ethylene glycol, glycerine and a diimide dicarboxylic acid prepared by reacting two moles of trimellitic anhydride with one mole of methylene dianiline. This diimide dicarboxylic acid is sometimes abbreviated hereinafter as DID. The polymers prepared in Schmidt have a triol to diol molar ratio of 0.676, a hydroxy to carboxy equivalent ratio of 1.41. The product has a 250° C. heat shock without using prestretch of the wire and employing one hour of baking.

The commercial material made under the Schmidt patent known as Terebec FH contains substantial amounts of ester derived from terephthalic acid and a small amount of imide derived from DID. Terebec FH in inferior in properties to the commercial polyester-imide, ISOMID, made in accordance with Meyer U.S. Pat. No. 3,426,098. Thus, in regard to heat shock precent passing one-half hour at 200° C. using 20 percent prestretch, the following results are noted.

| Mandrel Size | Terebec FH | ISOMID |
| --- | --- | --- |
| 1X | 30 | 0 |
| 2X | 50 | 80 |
| 3X | 60 | 100 |
| 4X | 90 | 100 |

When ISOMID was tested at 260° C., the results in the same Mandrel Sizes was 0-0-0-0.

It has previously been proposed to use polyesterimide resins as a top coat for electrical conductors coated with a polyester resin or other resin, e.g., Ishizuka U.S. Pat. No. 4,208,464, Keske U.S. Pat. No. 4,070,524, Czajka U.S. Pat. No. 3,944,706, Keske U.S. Pat. No. 4,012,555, and Keske U.S. Pat. No. 4,012,556. However, the products of these patents do not have sufficiently good heat shock properties. In fact, a number of these patents, e.g., the Keske and Czajka patents, are directed to self-bonding coatings for magnet wires. The self-bonding property is incompatible with good heat shock properties. Ishizuka prepares a water soluble polyester-imide having an acid value of 30-50, an OH/COOH equivalent ratio of 1:1 to 2:1 and requires a substantial amount of an aliphatic polycarboxylic acid.

SUMMARY OF THE INVENTION

It has now been found that there can be prepared a polyester-imide having outstanding physical properties when applied to a wire. Thus, it is capable of withstanding heat shock at 260° C. compared to the 200° C. of the commercial ISOMID referred to above. The new polyester-imide can compete, as a single-coat system, against the amide-imide topcoated polyester (e.g., amide-imide coated ISONEL 200/ system now used in the art). The new polyester-imide passes the A. O. Smith blister test and had good burn-out results.

The new polyester-imide employs as the dicarboxylic acid DID or a mixture of DID with a small amount of another aromatic dicarboxylic acid.

The parameters of the invention are as follows:

(1) A polyester-imide is made with a hydroxyl to carboxyl equivalent ratio of 2.65:1 to 3.67:1, preferably 2.65:1 to 3.33:1. The ratio can even be as high as 4.0:1.

(2) A polyester-imide is made with trihydric alcohol to dihydric alcohol molar ratio of 0.23:1 to 0.62:1, preferably 0.4:1 to 0.5:1.

(3) The polyester-imide is made with 40-50%, usually 42.5-50%, by equivalent, imide groups, preferably 45-50%, by equivalent, imide groups.

(4) The polyester-imide is made with the following mole percentages of ingredients:

|  | Mole % |
| --- | --- |
| Dihydric alcohol | 29–56 |
| Trihydric alcohol | 9–19 |
| Aromatic Diamine | 11–18 |
| Trimellitic Anhydride | 22–35 |
| Aromatic Diacid or Diester | 0–7 |

It should be noted that the molar ratios of the reactants change quite considerably depending on whether one starts with trimellitic anhydride and methylene dianiline on the one hand or prereacts them and then bases the calculation on the preformed DID. Two moles of TMA and one mole of MDA are condensed to become only one mole of DID, thereby changing the molar calculation. In Example 12 for instance, the mole percent of THEIC is 23% based on the use of DID, or 15.3% when the MDA and TMA are not prereacted to form DID. THEIC molar percentages are always higher in those cases using prereacted DID, because the DID always involve a fewer number of total moles and therefore the contribution of the THEIC becomes proportionately greater.

The mole ratios in parameter (4) and in the claims are calculated on a basis that TMA and the diamine are present rather than preformed DID.

(5) The polyester-imide normally has an average molecular weight of from 700 to 1300 or even up to 2,000, but preferably an average molecular weight of from 750–1050. The molecular weights were determined by Vapor Pressure Osmometer.

(6) The hydroxyl number of the polyester-imide frequently is within 380–420, but this can be varied, e.g., it can be as low as 350 or as high as 450.

(7) The polyester-imide is made using (1) tris (2-hydroxyethyl) isocyanurate (THEIC), (2) a dibasic acid such as terephthalic acid (TA) or its lower alkyl esters, e.g., dimethyl terephthalate (DMT), diethyl terephthalate or dibutyl terephthalate, (3) trimellitic anhydride (TMA), (4) a diamine, such as methylene dianiline or oxydianiline, preferably methylene dianiline and (5) a dihydric alcohol such as ethylene glycol.

(8) The polyester-imides of this invention can be cooked at 70–100% concentration in various kinds of solvent media, such as cresylic acid, n-methyl pyrrolidone, ethylene glycol, methyl Carbitol (monomethyl ether of diethylene glycol) or a mixture of 50% cresylic acid and 50% ethylene glycol.

(9) The polyester-imide resins of the invention are soluble in a wide variety of solvents including phenol, cresol or cresylic acid or other phenols or mixtures of phenols. They are preferably dissolved in a mixture of solvent containing 29-59% of cresylic Acid 43 (Merichem Co.), 12-19% of phenol, 17-38% of Solvesso 100 (a mixture of tetramethyl benzene with dialkyl- and trialkyl-benzene boiling in the range 182°-204° C.) or Solvesso 150 (a blend of 70% Solvesso 100 and 30% heavy aromatic naphtha). The solvent can be a mixture of 0-60% water, 0-28% n-methyl pyrrolidone, 0-17% ethylene glycol and 12-89% methyl Carbitol. To solubilize these polyester-imides in water, various amines may be employed that react with the free carboxylic groups or amic acid groups available to form the salts that are soluble in water. These amines may be of the alkyl and alkanolamines such as trimethylamine, triethylamine, triethanolamine, dimethylethanolamine, methyldiethanolamine. A sufficient quantity of amine is employed to raise the pH of the aqueous solution to a range of 7-9 and preferably 7.5-8.5.

There can be added to the wire enamels of the invention conventional modifiers such as Tyzor TPT (tetraisopropyltitanate), TBT (tetrabutyltitanate), tetraphenyltitanate, tetracresyltitanate, etc., as well as polyisocyanates, such as Mondur SH which is the cyclic trimer of 2,4 and 2,6-tolylene diisocyanates having the three free isocyanate groups blocked by phenol, or alternately any of the other polyisocyanates mentioned in Meyer U.S. Pat. No. 3,426,098, or cresol, or metal driers, e.g., cobalt naphthenate, manganese naphthenate, calcium naphthenate, zinc octoate and Polycat 200. There can be used other titanate and driers, e.g., any of those mentioned in Keating U.S. Pat. No. 4,119,608. Also there can be added to the enamel phenolic resins such as phenol-formaldehyde cresol-formaldehyde resins.

The wire enamels can be applied to copper, aluminum, silver or other wires using conventional coating procedures and wire speeds, e.g., 30-60 ft./min. and curing the wire is carried out at conventional temperatures, e.g., 260° C. to 482° C., usually 260°-427° C.

The polyester-imide of the invention also has been found useful to provide a topcoat for wires base coated with a polyester resin or another polyester-imide resin to provide a coated wire having good heat shock properties. Moreover, the present polyester-imides provide this improved heat shock coated wires at lower cost than using a conventional amide-imide polymer top coat (the normal procedure is to apply 4 coats of polyester base coat (e.g., Isonel 200 prepared from tris(2-hydroxyethyl) isocyanurate, ethylene glycol and terephthalic acid) followed by 2 coats of the amide-imide polymer using N-methyl pyrrolidone as a solvent.

Instead of using the amide-imide polymer when there is employed the polyester-imide enamel of the present invention as a topcoat (using 1 or 2 coats of the polyester-imide) for polyester (or a different polyester-imide) coated wire, there can be avoided the need for N-methyl pyrrolidone as a solvent. Lower cost solvents can be employed. Also, the enamel can be operated at higher solids content, e.g. 40%, so that less solvent goes up the stack.

The high temperature basecoats can be conventional polyesters, for example those set forth in Meyer U.S. Pat. No. 3,342,780 or convention polyester-imide resins, for example those in Meyer U.S. Pat. No. 3,426,098. The entire disclosures of both Meyer patents is hereby incorporated by reference and relied upon. Illustrative of the polyester resins are the reaction products of tris(2-hydroxyethyl) isocyanurate (THEIC), ethylene glycol and terephthalic acid or isophthalic acid. For Class F enamels, the THEIC in the base coat can be replaced by glycerine, trimethylolpropane or trimethylolethane.

Illustrative of a polyester-imide resin base coat is the reaction product of THEIC, ethylene glycol, terephthalic acid (or isophthalic acid), methylene dianiline (or oxydianiline) and trimellitic anhydride. In place of THEIC, there can be used glycerine, e.g. as in the polyester-imides of Schmidt U.S. Pat. No. 3,697,471, the entire disclosure of which is hereby incorporated by reference and relied upon. Likewise, there can be used as the base coat the diethylene glycol or triethylene glycol monoether modified polyester-imide resins of Keating U.S. Pat. No. 4,119,608, the entire disclosure of which is hereby incorporated by reference.

The polyester-imide consists essentially of or consists of the stated materials.

The composition can comprise, consist essentially of, or consist of the materials set forth.

Unless otherwise indicated, all parts and percentages are by weight.

The following abbreviations are used in the examples:
EG = ethylene glycol
TA = terephthalic acid
DMT = dimethyl terephthalate
TMA = trimellitic anhydride
THEIC = tris-(2-hydroxyethyl) isocyanurate
MDA = methylene dianiline
NMP = N-methyl pyrrolidone
TPT = tetraisopropyltitanate
DID = diimide diacid (adduct of 1 mol of MDA and 2 moles of TMA)
Tyzor TE = triethanolamine titanium chelate It has been found critical to use the stated materials. Thus, replacing THEIC by trimethylol propane or glycerine does not give as good results nor does replacing terephthalic acid by isophthalic acid or adipic acid as the other acid when less than 100% DID is used as the acid component. Likewise, replacing ethylene glycol with propylene glycol or 1,4-butanediol does not give as good results nor does including 1,2,3,4-butane tetracarboxylic anhydride as part of the acid. While it is preferable to employ ethylene glycol as the sole dihydric alcohol, it is possible to replace a minor portion of the ethylene glycol by another dihydric alcohol, e.g., an alkanediol, such as 1,4-butylene glycol. For example, there can be used an ethylene glycol-butylene glycol ratio of 75:25.

The imide content of the polyester-imide is expressed by $$\frac{\text{Imide equivalents}}{\text{Imide equivalents + Ester equivalents}}$$

EXAMPLE 1

(a) Preparation of Polymer

|     | Reactants | Weight Grams | Mols | Mol % of Total Reactants |
|-----|-----------|--------------|------|--------------------------|
| (A) | CA-43     | 321.9        | —    | —                        |
| (B) | EG        | 230.7        | 3.72 | 33.7                     |
| (C) | THEIC     | 440.8        | 1.69 | 15.3                     |
| (D) | TMA       | 721.0        | 3.76 | 34.0                     |

| Reactants | Weight Grams | Mols | Mol % of Total Reactants |
|---|---|---|---|
| (E) MDA | 371.9 | 1.88 | 17.0 |

The polyester-imide was made with hydroxyl/carboxyl ratio of 3.33/1, triol/diol molar ratio of 0.45/1 and 50% imide content(equivalent). Materials A, B, C, D and E were charged into a 3-liter, three-necked flask equipped with an agitator driven by an electronically-controlled motor, thermometer for flask, 3-bubble Snyder fractionating column and water-cooled condenser. The temperature was increased gradually to 220°-230° C. and held there until the desired physicals were attained. At a viscosity of X (Gardner-Holdt) as measured at 38% solids in cresylic acid the reaction was terminated, and the melt discharged into a pan to solidify. The solids of the resin were 86.7%, Molecular Weight of the polymer 987.

(b) Preparation of Wire Enamel

| | | Weight, Grams |
|---|---|---|
| (A) | The polyester-imide prepared in Example (1a) | 369.1 |
| (B) | CA-43 | 120.7 |
| (C) | Phenol | 90.5 |
| (D) | Solvesso 100 | 172.4 |
| (E) | Phenolic Resin (m, p Cresol-formaldehyde resin-% by weight dissolved in CA-43) | 36.6 |
| (F) | TPT | 12.2 |
| (G) | Blocked Isocyanate (Mondur SH-% by weight dissolved in CA-43 and Solvesso 100) | 70.4 |
| (H) | Ethylene Glycol | 17.0 |

A solution of the polymer 1(a) was made by dissolving the resin in (B), (C) and (D) and holding the mixture at 120° C. with agitation until it was dissolved. The solution was cooled to 88° C. and (E), (F) and (G) were added. The solution was then heated to 120° C. and held for two hours. The viscosity of the resulting wire enamel was a V ¾ and the solids were determined to be 39.2%.

(c) Preparation of Wire Enamel

| | | Weight, Grams |
|---|---|---|
| (A) | The polyester-imide prepared in Example 1(a) | 262.4 |
| (B) | CA-43 | 247.0 |
| (C) | Phenol | 109.8 |
| (D) | Solvesso 150 | 82.3 |
| (E) | Solvesso 100 | 109.8 |
| (F) | Phenolic Resin | 29.6 |
| (G) | TPT | 10.0 |
| (H) | Blocked Isocyanate | 63.1 |

The wire enamel was made by using the same procedure as described in Example 1(b) except the increased amounts of additives (F), (G) and (H) and 82.3 grams of Solvesso 150 were used in this formulation. The viscosity of this enamel was an E and the solids were determined to be 28.4%.

(d) Preparation of Wire Enamel

| | | Weight, Grams |
|---|---|---|
| (A) | The polyester-imide prepared in Example 1(a) | 262.4 |
| (B) | CA-43 | 238.8 |
| (C) | Phenol | 106.1 |
| (D) | Solvesso 150 | 79.6 |
| (E) | Solvesso 100 | 106.1 |
| (F) | Phenolic Resin | 17.4 |
| (G) | TPT | 6.4 |
| (H) | Blocked Isocyanate | 40.3 |

The wire enamel was made by using the same procedure as described in Example 1(b). The viscosity of this enamel was a D ¾ and the solids were determined to be 28.3%.

EXAMPLE 2

(a) Preparation of Polymer

| | Reactants | Weight, Grams | Mols | Mol % of Total Reactants |
|---|---|---|---|---|
| (A) | CA-43 | 330.2 | — | — |
| (B) | EG | 232.5 | 3.75 | 35.4 |
| (C) | THEIC | 440.6 | 1.69 | 16.0 |
| (D) | TMA | 657.6 | 3.43 | 32.4 |
| (E) | MDA | 339.1 | 1.71 | 16.2 |

The polyester-imide was made with imide content of 50 eq. % and a hydroxyl/carboxyl ratio of 3.67. The same procedure was used as described in Example 1(a). After a viscosity of U ½ was attained, the resin was discharged into a pan to solidify. The solids were determined to be 82.7%. The molecular weight of the polymer was 1082.

(b) Preparation of Wire Enamel

Polyester-imide 2(a), 386.8 grams, was used in place of 369.1 grams of polyester-imide 1(a) and the same procedure followed as in Example 1(b). The viscosity of the resulting wire enamel was a U and the solids were determined to be 40.3%.

EXAMPLE 3

(a) Preparation of Polymer

| | Reactants | Weight, Grams | Mols | Mol % of Total Reactants |
|---|---|---|---|---|
| (A) | CA-43 | 358.7 | — | — |
| (B) | EG | 319.7 | 5.16 | 41.0 |
| (C) | THEIC | 309.3 | 1.19 | 9.4 |
| (D) | TMA | 799.8 | 4.17 | 33.1 |
| (E) | MDA | 412.4 | 2.08 | 16.5 |

This polyester-imide with triol/diol molar ratio of 0.23/1 and imide content of 50 eq. % was made by using the same procedure as described in Example 1(a). A viscosity of U ½ and 79.6% solids were obtained for this polymer. The molecular weight of the polymer was 1290.

(b) Preparation of Wire Enamel

Polyester-imide 3(a), 401.6 grams, was used in place of 369.1 grams of polyester-imide 1(a) and the same procedure followed as in Example 1(b). The viscosity of the resulting wire enamel was a U ½ and the solids were determined to be 40.2%.

EXAMPLE 4

(a) Preparation of Polymer

| | Reactants | Weight, Grams | Mols | Mol % of Total Reactants |
|---|---|---|---|---|
| (A) | CA-43 | 394.8 | — | — |
| (B) | EG | 286.0 | 4.61 | 34.9 |
| (C) | THEIC | 542.1 | 2.08 | 15.7 |
| (D) | TMA | 806.4 | 4.20 | 31.8 |
| (E) | MDA | 415.8 | 2.10 | 15.9 |
| (F) | TA | 36.5 | 0.22 | 1.7 |

This polyester-imide with 47.5 equivalent % imide content was made by using the same procedure as described in Example 1(a). This polymer had a viscosity of V and a solids of 86.0%. The molecular weight was 1541.

(b) Preparation of Wire Enamel

The wire enamel solution was made by using the same procedure as described in Example 1(b) except with 371.7 grams of polyester-imide 4(a) in place of 369.1 grams of polyester-imide 1(a). This enamel had a viscosity of T ¾ and a solids of 38.8%.

EXAMPLE 5

(a) Preparation of Polymer

| | Reactants | Weight, Grams | Mols | Mol % of Total Reactants |
|---|---|---|---|---|
| (A) | CA-43 | 321.9 | — | — |
| (B) | EG | 251.7 | 4.06 | 36.0 |
| (C) | THEIC | 475.1 | 1.82 | 16.2 |
| (D) | TMA | 641.3 | 3.34 | 29.7 |
| (E) | MDA | 330.7 | 1.67 | 14.8 |
| (F) | TA | 61.0 | 0.37 | 3.3 |

This polyester-imide with 45 equivalent percent imide content was made by using the same procedure as outlined in Example 1(a) and the final polymer had a viscosity of V ¼ and a solids of 85.5%.

(b) Preparation of Wire Enamel

The wire enamel was made by using the same procedure as described in Example 1(b). The viscosity of T ¾ and solids of 39.4% were obtained for this wire enamel.

EXAMPLE 6

(a) Preparation of Polymer

| | Reactants | Weight, Grams | Mols | Mol % of Total Reactants |
|---|---|---|---|---|
| (A) | CA-43 | 347.9 | — | — |
| (B) | EG | 278.9 | 4.50 | 32.1 |
| (C) | THEIC | 529.1 | 2.03 | 14.5 |
| (D) | TMA | 894.7 | 4.66 | 33.2 |
| (E) | MDA | 461.3 | 2.33 | 16.6 |
| (F) | TA | 85.0 | 0.51 | 3.6 |

This polyester-imide with 45 equivalent % imide content and OH/COOH ratio of 2.65 was prepared by using the same equipment and procedure as outlined in Example 1(a). It was controlled to a final viscosity of X and a solids of 88.0%.

(b) Preparation of Wire Enamel

The wire enamel was made by using the same procedure as outlined in Example 1(b) except 363.3 grams of polyester-imide 6(a) were used in place of 369.1 grams of the polymer 1(a). A viscosity of V and a solids of 40.0% were obtained for this enamel.

EXAMPLE 7

(a) Preparation of Polymer

| | Reactants | Weight Grams | Mols | Mol % of Total Reactants |
|---|---|---|---|---|
| (A) | CA-43 | 149.3 | — | — |
| (B) | EG | 184.8 | 2.98 | 40.6 |
| (C) | THEIC | 222.4 | 0.852 | 11.6 |
| (D) | TMA | 384.0 | 2.0 | 27.3 |
| (E) | MDA | 198.0 | 1.0 | 13.6 |
| (F) | TA | 83.0 | 0.5 | 6.8 |

This polyester-imide with 40 equivalent % imide content, OH/COOH ratio of 2.84 and triol/diol molar ratio of 0.29 was prepared by employing the same equipment and procedure as outlined in Example 1(a). It was controlled to a final viscosity of U ½ and solids of 82.6%. The molecular weight of the polymer was 773.

(b) Preparation of Wire Enamel

The wire enamel was made by using the same procedure as described in Example 1(b) except with 387 grams of polyester-imide 7(a) in place of 369.1 grams of polyester-imide 1(a). A viscosity of U ¼ and solids of 40.0% were obtained for this enamel.

EXAMPLE 8

(a) Preparation of Polymer

The same equipment and procedure as outlined in Example 1(a) was employed in preparing this polymer except n-methyl pyrrolidone was used in place of cresylic acid as solvent medium. It was reacted to a viscosity of W at 38% solids in cresylic acid and a solids of 82.5%.

(b) Preparation of Conventional Wire Enamel

The wire enamel was made by using the same procedure as described in Example 1(b) except 364.5 grams of the polymer 8(a) was used in place of 369.1 grams of the polymer 1(a). A viscosity of X ½ and a solids of 40.3% were obtained for this wire enamel.

(c) Preparation of Aqueous Wire Enamels

The hard resin 8(a) was then fractured into small chunks, and 472.7 grams of the polymer along with 39.1 grams of methyl Carbitol was charged to a 3-liter, three-necked round-bottom flask, and heated to 132° C. until the polymer was fluid and dissolved. At a temperature of 120° C., 46.8 grams of dimethylethanolamine (DMEA) was added to the flask. Then the batch was cooled to 105° C., 182.1 grams of distilled water was added to the flask. Additional water, amine and solvent were added to reduce the viscosity. Then on a solids-to-solids basis 5.5% Tyzor TE was added to the solution to make the final enamel having a viscosity of X ¼, a pH of 8 and a solids of 47.6%.

EXAMPLE 9

(a) Preparation of Polymer

The same equipment and procedure as outlined in Example 1(a) was employed in preparing this polymer except methyl Carbitol was used in place of cresylic acid as solvent medium. It was reacted to a viscosity of V ¼ at 38% in cresylic acid and a solids of 80.9%.

(b) Preparation of Conventional Wire Enamel

The wire enamel was made by using the same procedure as described in Example 1(b) except 395.4 grams of the polymer 9(a) was used in place of 369.1 grams of the polymer 1(a). A viscosity of T ¼ and a solids of 40.7% were obtained for this enamel.

(c) Preparation of Aqueous Wire Enamel

Using the same equipment and procedure as described in 8(c) an aqueous enamel was prepared by blending 481.9 grams of base polymer 9(a) with 29.9 grams of methyl Carbitol, 66.8 grams of DMEA, 182.6 grams of distilled water and 21.9 grams of Tyzor TE to provide an enamel having the following properties: viscosity=X ½, pH=7.5, % solids=53.0%.

EXAMPLE 10

(a) Preparation of Polymer

|     | Reactants | Weight, Grams | Mols | Mol % of Total Reactants |
| --- | --- | --- | --- | --- |
| (A) | EG    | 552.6 | 8.91 | 54.9 |
| (B) | THEIC | 440.8 | 1.69 | 10.4 |
| (C) | TMA   | 721.0 | 3.76 | 23.2 |
| (D) | MDA   | 371.9 | 1.88 | 11.6 |

The same equipment and procedure as outlined in Example 1(a) was employed in preparing this polymer except ethylene glycol was used in place of cresylic acid as solvent medium. It was reacted to a viscosity of X ¾ at 38% solids in cresylic acid and a solids of 88.7%.

(b) Preparation of Conventional Wire Enamel

The wire enamel was made by using the same procedure as described in Example 1(b) except 360.8 grams of the polymer 10(a) was used in place of 369.1 grams of the polymer 1(a). A viscosity of T and a solids of 41% were obtained for this enamel.

(c) Preparation of Aqueous Wire Enamel

Using the same equipment and procedure as described in 8(c) an aqueous enamel was prepared by blending 439.7 grams of polymer 10(a), 72.1 grams of methyl Carbitol, 66.8 grams of DMEA, 182.6 grams of distilled water and 21.9 grams of Tyzor TE to provide an enamel having the following properties: viscosity=Y, pH=7.5, and % solids=48.6%.

EXAMPLE 11

(a) Preparation of Polymer

|     | Reactants | Weight, Grams | Mols | Mol % of Total Reactants |
| --- | --- | --- | --- | --- |
| (A) | CA-43 | 318.4 | —    | —    |
| (B) | EG    | 249.0 | 4.02 | 36.1 |
| (C) | THEIC | 471.8 | 1.81 | 16.2 |
| (D) | TMA   | 634.5 | 3.30 | 29.6 |
| (E) | MDA   | 327.3 | 1.65 | 14.8 |

|     | Reactants | Weight, Grams | Mols | Mol % of Total Reactants |
| --- | --- | --- | --- | --- |
| (F) | DMT   | 71.4 | 0.368 | 3.3 |
| (G) | Xylol |      |       |     |

This same equipment and procedure as outlined in Example 5(a) was employed in preparing this polymer except 61 grams of TA were replaced by 71.4 grams of DMT. It was controlled to a viscosity of U ¼ at 38% in cresylic acid and a solids of 81.6%. The molecular weight of the polymer was 1481.

(b) Preparation of Wire Enamel

The wire enamel was made by using the same procedure as described in Example 1(b) except 391.8 grams of the polymer 11(a) were used in place of 369.1 grams of the polymer 1(a). A viscosity of U ½ and a solids of 40.5% were obtained for this enamel.

EXAMPLE 12

(a) Preparation of Polymer

|     | Reactants | Weight, Grams | Mols | Mol % of Total Reactants |
| --- | --- | --- | --- | --- |
| (A) | CA-43 | 63.8  | —     | —    |
| (B) | EG    | 45.7  | 0.737 | 51.1 |
| (C) | THEIC | 87.3  | 0.334 | 23.1 |
| (D) | DID   | 203.2 | 0.372 | 25.8 |

The same equipment and procedure as outlined in Example 1(a) was employed in preparing this polymer except DID was used in place of TMA and MDA. It was reacted to a viscosity of U ¾ at 38% in cresylic acid and a solids of 84.8%. The molecular weight of the polymer was 1967.

(b) Preparation of Wire Enamel

The wire enamel was made by using the same procedure as described in Example 1(b) except 377.4 grams of the polymer 12(a) were used in place of 369.1 grams of the polymer 1(a). A viscosity of U ¾ and a solids of 39.2% were obtained for this enamel.

EXAMPLE 13

(a) Preparation of Polymer

|     | Reactants | Weight, Grams | Mols | Mol % of Total Reactants |
| --- | --- | --- | --- | --- |
| (A) | CA-43 | 321.9 | —    | —    |
| (B) | EG    | 230.7 | 3.72 | 33.7 |
| (C) | THEIC | 440.8 | 1.69 | 15.3 |
| (D) | TMA   | 721.0 | 3.76 | 34.0 |
| (E) | MDA   | 371.9 | 1.88 | 17.0 |
| (F) | Cobalt Naphthenate | 24 ppm* | | |
| (G) | Calcium Naphthenate | 96 ppm* | | |
| (H) | Manganese Naphthenate | 72 ppm* | | |

*Based on total solids of the batch

The same equipment and procedure as outlined in Example 1(a) was employed in preparing this polymer except metal driers, (F), (G) and (H) were added. It was reacted to a viscosity of X ¼ at 38% solids in cresylic acid and a solids of 86.1%.

(b) Preparation of Wire Enamel

The wire enamel was made by using the same procedure as described in Example 1(b) except 371.7 grams of polymer 13(a) were used to replace 369.1 grams of polymer 1(a). A viscosity of V ½ and a solids of 41.4% were obtained for this enamel.

EXAMPLE 14

(a) Preparation of Polymer

|   | Reactants | Weight, Grams | Mols | Mol % of Total Reactants |
|---|---|---|---|---|
| (A) | CA-43 | 321.9 | — | — |
| (B) | EG | 573.2 | 9.25 | 55.8 |
| (C) | THEIC | 440.8 | 1.69 | 10.2 |
| (D) | TMA | 721.0 | 3.76 | 22.7 |
| (E) | MDA | 371.9 | 1.88 | 11.3 |

The same equipment and procedure as outlined in Example 1(a) was employed in preparing this polymer except 342.5 grams of excess ethylene glycol was used in this formulation. It was controlled to a final viscosity of U ¾ and a solids of 82.6%.

(b) Preparation of Wire Enamel

The wire enamel was prepared by using the same procedure as described in Example 1(b) except 387.4 grams of the polymer 14(a) was used to replace 369.1 grams of the polymer 1(a). A viscosity of U and a solids of 41.6% were obtained for this enamel.

The percent solids of the base polymer and wire enamel solutions were determined using two-gram samples in a forced-air oven held at 200° C. for two hours.

After applying the enamels to the wire at room temperature, they were baked on in a conventional manner at 260°–480° C.

The heat shock was tested at 260° C. for one-half hour at 20% prestretch and the results reported as the percent passed.

The following table shows the properties with 18-gauge copper wire coated with the compositions of some of the examples described above.

A. O. Smith Freon Test

This is a standard Freon test developed by A. O. Smith Co.

Procedure

Prepare a coil using 5 feet of coated wire. Wind the coil on a mandrel (A. O. Smith specifications) to produce a 4–6% stretch on the wire. For 18 gauge, this is a mandrel of 1-1/6 inch outer diameter. Prebake coiled samples for two hours at 150° C. Remove and cool samples. Place in the Freon bomb and charge with 1½ pounds Freon 22. Raise the bomb pressure by heating to 600 psi and hold for six hours. Release pressure and immediately place coils in an oven at 150° C. for four hours. Remove coils and check for blistering. The samples fail according to the following: one large blister (in excess of wire diameter), two medium blisters (from one-half to one wire diameter) or five small blisters (less than half the wire diameter). A flexibility test is also run by wrapping a length of wire on a 5X mandrel for 10 turns. The film should not crack or peel. In addition, a twisted pair dielectric is run on the samples that pass the previous tests.

The Composition of CA-43

CA-43, a product of Merichem Co., is a mixture of phenol and its alkyl derivatives which has the following composition:

| Component | % by Weight |
|---|---|
| Phenol | 6–8 |
| O-cresol | 9–10 |
| M-cresol | 15–20 |
| P-cresol | 8–11 |
| O-Ethylphenol | 1–3 |
| M-Ethylphenol | 9–11 |
| P-Ethylphenol | 3–5 |
| 2,6-Dimethylphenol | 1 |
| 2,4-Dimethylphenol | 11–17 |
| 2,5-Dimethylphenol |  |
| 2,3-Dimethylphenol | 10–13 |
| 3,5-Dimethylphenol |  |
| 3,4-Dimethylphenol | 5–8 |

TABLE 1

| Example | Wire Speed Ft/Min. | Appear | Mandrel After Snap | Cut Thru °C. | 260° C. Heat Shock 1X 2X 3X 4X | Unidirect. Scrape | Burn Out (sec.) | Freon Resist. | Dissipation Factor (240° C.) | Build (mils) |
|---|---|---|---|---|---|---|---|---|---|---|
| 1(b) | 45 | 3 | 2X | 370 | 80-90-100-100 | 1000-1410 | 465 |  | 2.34 | 2.8 |
| 1(b) | 50 | 3 | 1X | 355 | 60-90-100-100 | 1100-1116 | 417 | OK-OK | 3.29 | 2.8 |
| 1(b) | 55 | 3 | 1X | 340 | 90-100-100-100 | 1100-1416 | 410 |  | 3.89 | 2.8 |
| 1(b) | 60 | 3 | 1X | 280 | 80-100-100-100 | 1166-1283 | 427 |  | 3.49 | 2.9 |
| 1(c) | 50 | 4 | 1X | 355 | 70-80-100-100 |  |  |  |  | 3.0 |
| 1(d) | 50 | 4 | 1X | 360 | 80-100-100-100 |  |  |  |  | 3.0 |
| 2(b) | 50 | 3 | 1X | 355 | 60-70-90-100 | 1250-1400 |  |  |  | 2.8 |
| 3(b) | 50 | 3 | 1X | 325 | 70-90-100-100 |  |  |  |  | 2.9 |
| 4(b) | 50 | 3 | 1X | 375 | 70-80-100-100 |  |  |  |  | 2.9 |
| 5(b) | 45 | 3 | 1X | 370 | 30-80-100-100 | 1000-1000 |  |  |  | 2.9 |
| 6(b) | 50 | 3 | 1X | 360 | 40-80-100-100 | 1200-1416 |  |  |  | 3.0 |
| 7(b) | 50 | 3 | 1X | 360 | 50-80-90-100 | 1000-1500 |  |  |  | 3.0 |
| 8(b) | 50 | 4 | 1X | 320 | 10-80-90-100 |  |  |  |  | 3.0 |
| 8(c) | 50 | 3 | 1X | 295 | 50-80-100-100 | 1300-1466 |  |  |  | 2.9 |
| 9(b) | 50 | 4 | 1X | 350 | 50-90-100-100 | 1000-1250 |  |  |  | 2.9 |
| 9(c) | 50 | 4 | 1X | 290 | 10-80-100-100 | 1000-1216 |  |  |  | 2.9 |
| 10(b) | 45 | 3 | 1X | 365 | 10-70-90-100 | 1100-1450 | 475 |  | 3.62 | 3.0 |
| 13(b) | 45 | 3 | 1X | 385 | 30-90-100-100 | 1450-1450 | 459 |  | 3.51 | 2.9 |
| 14(b) | 50 | 4 | 1X | 355 | 50-80-90-100 |  |  |  |  |  |

| -continued | |
|---|---|
| Component | % by Weight |
| 2,4,6-Trimethylphenol | 1 |

The formula of DID is

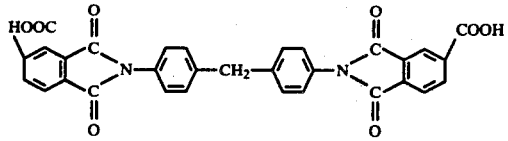

The polyester-imides of the present invention as indicated above are useful as a top coat for wires having a base coat of a polyester or of a different polyester-imide. The polyester-imide products of the present invention produce electrical conductor coatings having extraordinarily high heat resistance.

Thermobonding and high heat resistance are mutually exclusive properties. A polymer having a structure that will lend the polymer softenable and bondable at temperatures such as 175° C. will not be able to withstand the performance rigors that the present polyester-imide product withstands at 260° C. Likewise, the present product that is constructed to withstand 260° C. does not show the following bondability at 175° C. Experiments show that the present high, heat resistance polymer has absolutely no bond strength and therefore undergoes no softening at conditions used by the Keske to obtain bonding for their polymers.

Moreover, the Keske and Czajka polyester-imide coatings are high molecular weight thermoplastic compositions while the polyester-imide coatings of the present invention are low molecular weight thermosetting resins generally having an acid value between 0 and 10.

In following Table 2, the basecoat was Isonel 200 (tris-2-hydroxyethyl) isocyanurate-ethylene glycol-terephthalate). The wire construction contained four coats of the basecoat and two coats of the respective topcoats, except for the last sample of the new E.I. where there was only one topcoat layer and five Isonel 200 basecoat layers.

In Table 2 the topcoat referred to as AI is a polyamide-imide based on the following formulation:

| N—methylpyrrolidone | (NMP) | 80.4 | grams |
|---|---|---|---|
| Methylene diphenyl diisocyanate | (MDI) | 25.0 | grams |
| Amyl alcohol | | 0.85 | grams |
| Trimellitic anhydride | (TMA) | 19.1 | grams |
| Solvesso 100 | | 34.3 | grams |

These ingredients were cooked in conventional manner to produce an enamel solution having a viscosity range of X ½-Y on the Gardner-Holdt scale at a solids content of 26.5–28.5% based on a two-gram sample that is baked for two hours in a forced air oven at 200° C. The topcoat referred to as ISOMID is based on the following formulation:

| Polyesterimide resin at 82.5% solids | 115.2 | grams |
|---|---|---|
| Cresylic Acid | 177.4 | grams |
| Solvesso 100 | 112.8 | grams |
| Cresol formaldehyde resin at 40 ± 2% solids | 15.1 | grams |
| Tetra Isopropyl Titanate | 5.1 | grams |
| Isocyanate resin at 40 ± 2% solids, Mondur SH | 32.8 | grams |
| 840 Silicone Resin | 0.35 | grams |

The enamel solution was prepared in a conventional manner similar to that used in the other examples to give an enamel having a solids content of 26.5–28.5% and a viscosity of T ½-U ½ on the Gardner-Holdt scale.

The topcoat referred to as "New EI" is the product described in Example 1 of the patent application.

TABLE 2

| | AL/ISONEL ® | ISOMID ®/ISONEL ® | New E.I./ISONEL ® |
|---|---|---|---|
| Pass | 2/4 | 2/4 | 2/4 1/5 |
| Heat Shock | | | |
| 260° C. | 80-80-90-100 | 0-0-0-0 | 10-50-70-80 10-20-40-60 |
| 220° C. | 80-100-100-100 | 0-0-0-0 | 30-40-70-100 70-80-90-100 |
| 200° C. | 80-100-100-100 | 60-80-90-100 | 80-100-100-100 50-80-90-100 |
| Windability (1500V) | Pass 24 | Pass 20 | Pass 24 Pass 13 |
| A.O.Smith (Freon) Blister | Two large blisters Top coat lossened | Fails | Few Blisters Fails |
| Flex | Passes | Fails | Passes Fails |
| Diel(KV) After | 16.5 | Fails | 14.0 Fails |

If there is compared the heat shock values at 200° C., it can be seen that all constructions are approximately equal in performance. However, as the temperature of heat shocking is raised to 220° C., the construction with the ISOMID topcoat completely fails the test. The new polyesterimide covered passes a 4X mandrel at 220° C. At 220° and 260° C., it does not quite measure up exactly to the heat shock resistance of the AI/ISONEL construction, but offers acceptable performance at a much lower price. AI/ISONEL construction is based on a polyamideimide at approximately 22–28% solids using very expensive N-methyl-pyrrolidone as a solvent. The new polyesterimide uses conventional cresylic acid/hydrocarbon solvent blends which are considerably cheaper, and employs considerably higher solids levels.

In order to show the difference between the new polyester-imide topcoat and that of the Keske patent, ISONEL 200 coated wire was topcoated with the new polyester-imide and the coated wire was wound, bonded at 175° C. for 1 hour and tested for bond strength. The results compared to that of Keske are set forth below.

| | Bond Strength, lbs. at | | |
|---|---|---|---|
| Sample | RT | 175° C. | |
| New E.I. (of Example 1) | 0 | 0 | |
| Keske's E.I. | 14.5 | 1.5 | (U.S. Pat. No. 4,012,255, |

| | Bond Strength, lbs. at | |
|---|---|---|
| Sample | RT | 175° C. |
| | col. 8, line 49) | |

What is claimed is:

1. A polyester-imide having a hydroxy to carboxy equivalent ratio of 2.65:1 to 3.67:1, a trihydric alcohol to dihydric alcohol molar ratio of 0.23:1 to 0.62:1, the polyester-imide containing 40 to 50 equivalent % of imide groups, the imide groups being from the imide dibasic acid of the formula

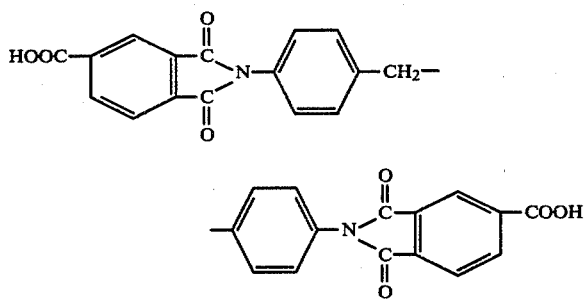

the polyester having been made with the following mole percentages of ingredients:

| | Mol % |
|---|---|
| dihydric alcohol | 29–56 |
| trihydric alcohol | 9–19 |
| aromatic diamine | 11–18 |
| trimellitic anhydride | 22–35 |
| aromatic diacid or diester | 0–7 | wherein the dihydric alcohol is ethylene glycol, the trihydric alcohol is tris(2-hydroxyethyl) isocyanurate, the aromatic diamine is methylene dianiline, the mole ratio of trimellitic anhydride to methylene dianiline is about 2:1, the aromatic diacid is terephthalic acid and the aromatic diester is a di(lower alkyl) terephthalate, the polyester-imide has a molecular weight of 700 to 2000, the hydroxyl number of the polyester-imide is 350 to 450, said polyester-imide being capable of forming a single coat insulating coating on an electrical wire capable of withstanding heat shock at 260° C.

2. A polyester-imide according to claim 1 wherein there is employed terephthalic acid.

3. A polyester-imide according to claim 1 wherein the aromatic diacid or diester content is 0.

4. A polyester-imide according to claim 1 wherein the aromatic diacid or diester content is 2–7 mole %.

5. A polyester-imide according to claim 1 having a molecular weight of 750–1050.

6. A polyester-imide according to claim 1 having a hydroxy to carboxyl equivalent ratio of 2.65:1 to 3.33:1, a trihydric alcohol to dihydric alcohol molar ratio of 0.4:1 to 0.5:1 and the polyester-imide contains 42.5–50 equivalent % of imide groups.

7. A polyester-imide according to claim 6 wherein the polyester-imide contains 45–50 equivalent % of imide groups.

8. A process of preparing the polyesterimide of claim 1 comprising heating (1) the dihydric alcohol, trihydric alcohol, aromatic diamine and trimellitic anhydride or (2) the dihydric alcohol, trihydric alcohol, aromatic diamine, trimellitic anhydride and the aromatic diacid or diester in an organic solvent until the polyester-imide is formed.

9. A process of preparing the polyesterimide of claim 1 comprising heating (1) the dihydric alcohol, trihydric alcohol or (2) the dihydric alcohol, trihydric alcohol, performed imide dibasic acid and aromatic diacid or diester in an organic solvent until the polyester-imide is formed.

10. An electrical conductor having an insulating coating prepared by curing the polyesterimide of claim 1 thereon.

11. An electrical conductor according to claim 10 wherein the conductor is in the form of wire.

12. An electrical conductor in wire form having an insulating coating prepared by curing the polyester-imide of claim 2 thereon.

13. An electrical conductor in wire form having an insulating coating prepared by curing the polyester-imide of claim 3 thereon.

14. An electrical conductor in wire form having an insulating coating prepared by curing the polyester-imide of claim 4 thereon.

15. An electrical conductor in wire form having an insulating coating prepared by curing the polyester-imide of claim 5 thereon.

16. An electrical conductor in wire form having an insulating coating prepared by curing the polyester-imide of claim 6 thereon.

17. An electrical conductor in wire form having an insulating coating prepared by curing the polyester-imide of claim 7 thereon.

18. A coating composition containing the polyester-imide of claim 1 dissolved in an organic solvent.

19. A coating composition according to claim 18 free from water.

20. A coating composition comprising an aqueous solvent and the reaction product of the polyester-imide of claim 1 with sufficient amount of a tertiary amine to render the reaction product soluble in the aqueous solvent mixture.

21. A coating composition according to claim 20 having a pH of 7 to 9.

22. A coating composition according to claim 21 wherein the pH is 7.5 to 8.5.

23. A process of preparing an insulated electrical conductor wire comprising applying to the wire the coating composition of claim 21 and curing the polyester-imide on the wire.

24. The insulated wire produced by the process of claim 23.

25. The process of preparing an insulated electrical conductor wire comprising applying to the wire the coating composition of claim 20 and curing the polyester-imide on the wire.

26. The insulated wire prepared by the process of claim 25.

27. The process of preparing an insulated electrical conductor wire comprising applying to the wire the coating composition of claim 19 and curing the polyester-imide on the wire.

28. The insulated wire prepared by the process of claim 27.

29. The polyester-imide according to claim 1 having a molecular weight of 700–1300.

30. A polyester-imide having a hydroxy to carboxy equivalent ratio of 2.65:1 to 4.0:1, a trihydric alcohol to dihydric alcohol molar ratio of 0.23:1 to 0.62:1, the polyester-imide containing 40 to 50 equivalent % of imide groups, the imide groups being from the imide dibasic acid of the formula

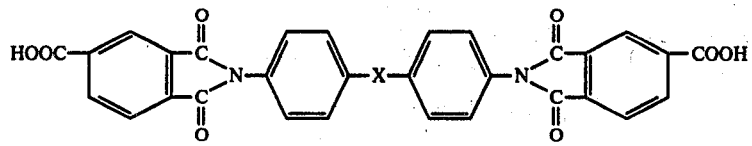

where X is O or CH$_2$, the polyester having been made with the following mole percentages of ingredients:

|  | Mol % |
|---|---|
| dihydric alcohol | 29–56 |
| trihydric alcohol | 9–19 |
| aromatic diamine | 11–18 |
| trimellitic anhydride | 22–35 |
| aromatic diacid or diester | 0–7 | wherein the dihydric alcohol is ethylene glycol or a mixture of ethylene glycol and a minor amount of another alkanediol, the trihydric alcohol is tris(2-hydroxyethyl) isocyanurate, the aromatic diamine is methylene dianiline or oxydianiline, the mole ratio of trimellitic anhydride to methylene dianiline or oxydianiline is about 2:1, the aromatic diacid is terephthalic acid and the aromatic diester is a di(lower alkyl) terephthalate, the polyester-imide has a molecular weight of 700 to 2000, the hydroxyl number of the polyester-imide is 350 to 450, said polyester-imide being capable of forming a single coat insulating coating on an electrical wire capable of withstanding heat shock at 260° C.

31. A polyester-imide according to claim 30 wherein the aromatic diamine is oxydianiline and the hydroxy to carboxy equivalent ratio is 2.65:1 to 3.67:1.

32. An electrical conductor having an insulating top coat prepared by curing the polyester-imide of claim 30 thereon and a base coat of a polyester or a different polyester-imide.

33. An electrical conductor according to claim 32 wherein the base coat is a polyester.

34. An electrical conductor according to claim 33 wherein the polyester is a tris(2-hydroxyethyl) isocyanurateethylene glycol terephthalate polymer.

35. An electrical conductor according to claim 33 wherein the conductor is in the form of a wire.

36. An electrical conductor according to claim 32 wherein the conductor is in the form of a wire.

37. An electrical conductor having an insulating top coat prepared by curing the polyester-imide of claim 1 thereon and a base coat of a polyester or a different polyester-imide.

38. An electrical conductor according to claim 37 wherein the base coat is a polyester.

39. An electrical conductor according to claim 38 wherein the polyester is a tris(2-hydroxyethyl) isocyanurateethylene glycol terephthalate polymer.

40. An electrical conductor according to claim 38 wherein the conductor is in the form of a wire.

41. An electrical conductor according to claim 37 wherein the conductor is in the form of a wire.

42. An electrical conductor according to claim 41 wherein there is employed terephthalic acid as a component of the polyester-imide having an equivalent ratio of 2.65:1 to 3.67:1.

43. An electrical conductor according to claim 41 wherein said aromatic diacid or diester content is 0.

44. An electrical conductor according to claim 41 wherein said aromatic diacid or diester content is 2–7 mole %.

45. An electrical conductor according to claim 41 wherein the molecular weight of the polyester-imide having an equivalent ratio of 2.65:1 to 3.67:1 is 750–1050.

46. An electrical conductor according to claim 41 wherein the polyester-imide has a hydroxy to carboxyl equivalent ratio of 2.65:1 to 3.33:1, a trihydric alcohol to dihydric alcohol molar ratio of 0.4:1 to 0.5:1 and the polyester-imide contains 42.5–50 equivalent % of imide groups.

47. An electrical conductor according to claim 46 wherein the polyester-imide contains 45–50 equivalent % of imide groups.

48. A process of preparing an insulated electrical conductor wire comprising applying to the wire a base coat of a polyester or a polyester-imide and there applying a top coat of the polyester-imide of claim 30, the polyester-imide of the base coat being different from that of the top coat.

49. A process of preparing an insulated electrical conductor wire comprising applying to the wire a base coat of a polyester or a polyester-imide and there applying a top coat of the polyester-imide of claim 1, the polyester-imide of the base coat being different from that of the top coat.

50. An electrical conductor according to claim 10 wherein the coating also contains a phenol-formaldehyde or cresol-formaldehyde resin.

51. An electrical conductor according to claim 50 wherein the coating contains a m,p-cresol-formaldehyde resin.

52. A coating composition according to claim 18 including a phenol-formaldehyde or cresol-formaldehyde resin.

53. A coating composition according to claim 32 including a m,p-cresol-formaldehyde resin.

54. A coating composition according to claim 20 including a phenol-formaldehyde or cresol-formaldehyde resin.

55. A coating composition according to claim 54 including a m,p-cresol-formaldehyde resin.

56. A process according to claim 25 wherein the coating composition includes a phenol-formaldehyde or cresol-formaldehyde resin.

57. The insulated wire produced by the process of claim 56.

58. A process according to claim 56 wherein the coating composition includes a m,p-cresol-formaldehyde resin.

59. The insulated wire produced by the process of claim 58.

60. A process according to claim 27 wherein the coating composition includes a phenol-formaldehyde or cresol-formaldehyde resin.

61. The insulated wire produced by the process of claim 60.

62. In an electrical conductor having an insulating coating comprising a polyesterimide the improvement of employing as the polyesterimide the product obtained by curing the polyesterimide of claim 1 on said electrical conductor.

63. In a coating composition containing a polyesterimide dissolved in an organic solvent the improvement comprising employing as the polyester-imide the polyester-imide of claim 1.

64. In a coating composition comprising an aqueous solvent and a polyester-imide the improvement comprising employing as the polyester-imide the reaction product of the polyester-imide of claim 1 with sufficient amount of a tertiary amine to render the reaction product soluble in the aqueous solvent mixture.

65. An electrical conductor according to claim 32 wherein the coating also contains a phenol-formaldehyde or cresol-formaldehyde resin.

66. An electrical conductor according to claim 65 wherein the coating contains a m,p-cresol-formaldehyde resin.

67. An electrical conductor according to claim 33 wherein the top coat also contains a phenol-formaldehyde or cresol-formaldehyde resin.

68. An electrical conductor according to claim 34 wherein the top coat also contains a phenol-formaldehyde or cresol-formaldehyde resin.

69. A process according to claim 48 wherein the top coating composition includes a phenol-formaldehyde or cresol-formaldehyde resin.

70. The insulated wire produced by the process of claim 69.

71. A process according to claim 69 wherein the coating composition includes a m,p-cresol-formaldehyde resin.

72. The insulated wire produced by the process of claim 71.

73. A process according to claim 49 wherein the coating composition includes a phenol-formaldehyde or cresol-formaldehyde resin.

74. The insulated wire produced by the process of claim 73.

75. In an electrical conductor having an insulating coating comprising a polyesterimide the improvement of employing as the polyesterimide the product obtained by curing the polyesterimide of claim 30 on said electrical conductor.

76. In a coating composition containing a polyester-imide dissolved in an organic solvent the improvement comprising employing as the polyester-imide the polyester-imide of claim 30.

77. In a coating composition comprising an aqueous solvent and a polyester-imide the improvement comprising employing as the polyester-imide the reaction product of the polyester-imide of claim 30 with sufficient amount of a tertiary amine to render the reaction product soluble in the aqueous solvent mixture.

* * * * *